United States Patent [19]

Kooijmans et al.

[11] 4,427,805

[45] Jan. 24, 1984

[54] THERMOSETTING RESINOUS BINDER COMPOSITIONS, THEIR PREPARATION AND USE AS COATING MATERIALS

[75] Inventors: Petrus G. Kooijmans; Werner T. Raudenbusch; Adrianus M. C. Van Steenis; Wolfgang Kunze; Josepha M. E. Seelen-Kruijssen, all of Amsterdam, Netherlands

[73] Assignee: Shell Oil Company, Houston, Tex.

[21] Appl. No.: 415,506

[22] Filed: Sep. 7, 1982

Related U.S. Application Data

[62] Division of Ser. No. 255,196, Apr. 20, 1981, Pat. No. 4,362,847.

[30] Foreign Application Priority Data

May 22, 1980 [GB] United Kingdom ................. 8016916

[51] Int. Cl.$^3$ .............................................. C08L 63/02
[52] U.S. Cl. ................................. 523/417; 204/181 C; 523/404; 523/414; 523/420; 523/426; 524/558; 524/577; 524/601; 524/608; 524/901; 524/902; 524/904
[58] Field of Search ..................... 204/181 C; 523/417, 523/404, 414, 420, 426; 524/901, 902, 904; 525/165, 172, 187, 425, 438, 444, 526, 533, 930, 934

[56] References Cited

U.S. PATENT DOCUMENTS 3,956,245  5/1976  Van Steenis ..................... 260/878 R
4,148,772  4/1979  Marchetti et al. ........... 260/29.2 EP

*Primary Examiner*—Theodore E. Pertilla
*Attorney, Agent, or Firm*—Norris E. Faringer

[57] ABSTRACT

The present invention is directed to thermosetting binder compositions for coating, comprising:

(I)
    (1) a non-acidic resinous compound, saturated, molecular weight at least 900, alcoholic hydroxyl content at least 0.2 eq/100 g;
    (2) a cross-linking agent comprising a nonacidic polyester of a polycarboxylic acid, having more than one beta-hydroxyl ester group per molecule, at least one of components (1) and (2) having an alcoholic hydroxyl functionality of more than 2, and
(II) a curing catalyst comprising a transesterification-promoting metal compound which is insoluble in liquid hydrocarbons.

These compositions can be used in solvent-based lacquers and paints, in coating powders, aqueous powder suspensions, in aqueous coating compositions for cathodic electrodeposition; for aqueous compositions component (1) (1) is preferably an epoxy resin/amine adduct.

8 Claims, No Drawings

THERMOSETTING RESINOUS BINDER COMPOSITIONS, THEIR PREPARATION AND USE AS COATING MATERIALS

This is a division of application Ser. No. 255,196, filed Apr. 20, 1981, now U.S. Pat. No. 4,362,847, issued Dec. 7, 1982.

FIELD OF THE INVENTION

The present invention relates to thermosetting resinous binder compositions which can be cured through a transesterification mechanism catalyst and to the use of these binder compositions for application as solvent-borne paints and varnishes and water-borne paints.

BACKGROUND OF THE INVENTION

Thermosetting hydroxyl-containing resinous coating materials usually contain a cross-linking component, such as a phenolic resin, an aminoplast resin or a polyisocyanate; for epoxy resins also polyamines, polycarboxylic acids and anhydrides thereof have found widespread use; curing catalysts are often added to reduce curing time and/or temperature. Curing times of up to $\frac{1}{2}$ hour and curing temperatures of up to 200° C. are for many purposes acceptable in the thermosetting coating field. The cross-linking component reacts during stoving with hydroxyl and/or epoxy groups of the main resinous binder component, and the cross-linking provides a coating which is insoluble and infusible, and therefore resistant to solvents and elevated temperatures.

Another type of coating materials contain an air-drying binder, which can cross-link through carbon-carbon double bonds, in contact with oxygen; drying accelerators are here some metal salts, such as cobalt and mangenese naphthenate.

SUMMARY OF THE INVENTION

The invention relates to a novel type of thermosetting resinous binder compositions. The novel aspect is that these binders can be cured through a transesterification mechanism, have a binder structure that responds within acceptable times at acceptable temperatures to transesterification, and contain curing catalysts that are suitable for this purpose. The invention further relates to methods for preparing the resinous binders and to the use of the compositions for application in coatings, for example, as a solvent-based varnish or paint, a coating powder, an aqueous dispersion, or as a water-borne paint, in particular, for cathodic electrodeposition.

DESCRIPTION OF THE PREFERRED EMBODIMENT

The invention is directed to a thermosetting binder composition, heat-curable to give an insoluble infusible coating, comprising:

(1) a mixture or precondensate of:

(1) a non-acidic resinous compound essentially free of ethylenic unsaturation, having a molecular weight of at least 900 and a hydroxyl content of at least 0.2 equivalents per 100 g, and (2) a cross-linking agent comprising a non-acidic polyester of a polycarboxylic acid, having more than one beta-hydroxyl ester group per molecule, wherein at least one of components (1) and (2) has a hydroxyl functionality of more than 2, and (II) a curing catalyst comprising a transesterification-promoting metal compound which is insoluble in liquid hydrocarbons.

In this context some general expressions are defined and explained hereinafter.

Non-acidic means that the material has an acid value of not more than 0.18 meq/g (acid number not more than 10). This will allow a residual acid content which in some cases is inevitable in practice due to the metod of preparation. Preferably, the acid content is not more than 0.09 meq/g, and for systems intended for cathodic electrodeposition the acid content is preferably not more than 0.02 meq/g; all values are based on non-volatile material.

Hydroxyl means aliphatic or cycloaliphatic hydroxyl, not phenolic hydroxyl.

Beta-hydroxyl ester in the definition of component (I) (2) means that the carbon atom adjacent to the esterified hydroxyl has a free hydroxyl group; in other words, the ester function is derived from a 1,2-glycol of which only one of the hydroxyl functions has been esterified. The glycol part may have substituents, such as alkyl-, ether- or stable ester groups. Stable as used herein means that the ester group is difficult to hydrolyze, as is the case with esters of branched monocarboxylic acids as hereinafter defined. This type of stable ester bonds will not give rise to transesterification reactions under normal stoving conditions.

Branched monocarboxylic acids as herein referred to are saturated aliphatic monocarboxylic acids wherein the carboxyl group is attached to a tertiary or quaternary carbon atom, i.e., alpha-branched, and which contain 9 to 11 carbon atoms per molecule.

Component (I) (1) has a hydroxyl content of at least 0.2, preferably at least 0.23, and preferably not more than 0.8 equivalents per 100 g. Component (I) (1) should be a soluble, fusible compound. Component (I) (1) may be chosen from several classes of hydroxyl-containing resinous materials, such as alkyd resins, epoxy resins, including the linear polymeric type derivatives of bisphenol A and epichlorohydrin, esters of epoxy resins, amine adducts of epoxy resins, and polymers prepared by polymerization or copolymerization of ethylenically unsaturated monomers.

A preferred type of alkyd resin is an alkyd resin prepared from a polycarboxylic acid or anhydride thereof, a polyhydric alcohol, and glycidyl esters of alpha-branched monocarboxylic acids.

Another preferred component (I) (1) is an epoxy resin or derivative thereof. Preferred epoxy resins are glycidyl ethers of 2,2-bis(4-hydroxyphenyl)propane having the general formula:

$$CH_2-CH-CH_2-\left[-O-R-O-CH_2-CH-CH_2-\right]_r-O-R-O-CH_2-CH-CH_2$$
$$\underset{O}{\diagdown \diagup} \qquad\qquad\qquad\quad \underset{OH}{|} \qquad\qquad\qquad\quad \underset{O}{\diagdown \diagup}$$

wherein R is the group:

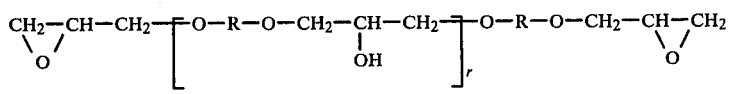

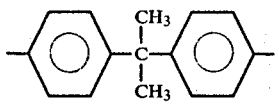

and r is a number which for epoxy resins of different molecular weight can differ. For making soluble derivatives preference is given to liquid or semi-liquid epoxy resins (wherein r has a value of from 0 to 1) or to the lower solid epoxy resins wherein r has a value of up to 4.

Epoxy resins which are suitable without modification have a molecular weight of more than 1400, and r has a value of more than 4. In the solid resins of the latter type of great part of the terminal glycidyl groups is usually present in hydrolyzed form as glyceryl groups, due to the methods of preparation. Suitable epoxy resins of this type have molecular weights from 2000 to 4000, epoxy equivalent weights of the same order, and have from 0.35 to 0.40 hydroxyl equivalents per 100 g; the epoxy content is too low to effect sufficient cross-linking without a cross-linking agent.

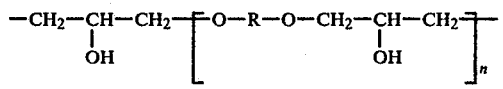

Another suitable polyether of the latter type is a high molecular weight linear polyhydroxyl ether, having a molecular weight of more than 20,000 and containing about 0.35 hydroxyl equivalents per 100 g. Molecular weights herein are average molecular weights (Mn) as usual in polymeric compounds.

Suitable derivatives of epoxy resins are hydroxyl-containing esters, such as esters obtained by esterification of one or both epoxy groups of the lower epoxy resins (wherein r in the above formula has a value of from 0 to 4) with a monocarboxylic acid, preferably a hydroxyalkane monocarboxylic acid, propionic acid. Such esterifications are preferably carried out at temperatures below 150° C. to avoid esterification of hydroxyl groups, in the presence of catalysts known to accelerate epoxy-carboxyl addition reactions, such as tertiary amines, quaternary ammonium salts, quaternary phosphonium salts, stannous octoate, etc.

Other suitable epoxy resin derivatives are soluble adducts with primary and/or secondary amines, in particular with amines having one or more hydroxyalkyl groups, such as monoethanolamine and diethanolamine. Preferred are soluble adducts having the formula:

A—B—C—B)$_m$A wherein m is a number from 0 to 2, A is a group which is linked to B through a secondary or preferably a tertiary amino function and being derived from an amine having one secondary amino group and is preferably an alkanolamino group, B is a group

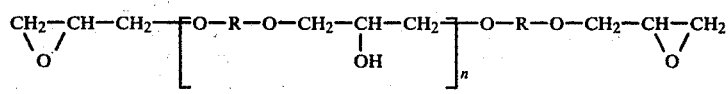

-continued
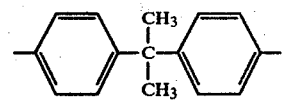

wherein n is a number from 0 to 4 and R is the hydrocarbon radical of a dihydric phenol, C is a group which is linked to B through two tertiary amino functions and being derived from an amine having two secondary amino groups or one primary mono-amino group. This type will further be referred to as a "linear" amine adduct.

Other suitable amine adducts are compounds hving the formula:

[A—B(—C—B)$_m$]$_p$D wherein A, B, C and m have the same meaning as above, p is a number from 3 to 4, and D is a group linked to B through p tertiary amino functions. This type will further be referred to as a "branched" amine adduct.

Group B is derived from a diglycidyl ether having the formula:

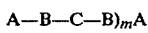

wherein n is a number from 0 to 4, preferably from 1 to 3, in particular 1.8 to 2.2, and R the hydrocarbon radical of a dihydric phenol, preferably the group:

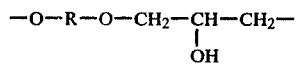

The latter dihydric phenol is 2,2,-bis(4-hydroxyphenyl)propane, and diglycidyl ethers thereof are known commercial products EPON ® Resin 828 1001 and 1004 are diglycidyl ethers, wherein n in the above formula has a value of about 0, 2 or 4, respectively). Group A is derived from an amine that has a single secondary amino function but may further have a variety of functional groups, provided they do not react with glycidyl ether groups under the reaction conditions used. Examples of such "latent" groups include hydroxyl groups, ketimine groups and ester groups. Examples of suitable amines of this type are diethanolamine, di-isopropanolamine and the diketimine of diethylene triamine with methyl isobutyl ketone.

Group C is derived from an amino compound having per molecule two N-H functions that are reactive with epoxy groups. These functions may be embodied in a single primary mono-amino function or in two secondary amino functions. Further this amine may have other functions as well which react hardly if at all with epoxy groups, such as hydroxyl or tertiary amino. Examples are monoethanolamine, monoisopropanolamine, 3-(N,N-dimethylamino)propylamine, the reaction product of one mole of 1,6-diaminohexane with 2 moles of glycidyl ester of branched monocarboxylic acids, and amino-containing amides.

For the preparation of the linear amine adducts the diglycidyl ethers are preferably reacted with amines as described above in the ratio of one amino-hydrogen atom per epoxy group, in which reaction the amount of an amine having a single secondary amino group may vary from 33 to 100% of the available epoxy groups. If water-sensitive components, such as amines substituted with ketimine groups are used, the reactions thereof with the glycidyl compound should be carried out under anhydrous conditions. Reaction of the amines with the diglycidyl ethers can be effected in one or more steps, thus a secondary amime may first be allowed to react with the diglycidyl ether and then an amine with the two reactive N-H functions added. Solvents such as glycol ethers or ketones can be used in the preparation of the adducts. The reaction temperature may be 70°–140° C. and is preferably 70°–120° C. It will be clear that the value for m is an average and that this type of component (I) (1) indicates a general structure of a mixture of reaction products.

The "branched" amine adducts can be prepared by reacting first, a part (say 25 to 40 percent) of the epoxy groups of a diglycidyl ether with a secondary monoamine, such as diethanolamine or dipropanolamine at moderate temperature, and then reacting the product with the polyfunctional amines.

An amine having p N-H functions per molecule provides in the final adduct, the structural group D; the N-H functions may be embodied in primary or in secondary amino groups, and further this amine may have other functions that react hardly if at all with epoxy groups, such as hydroxyl, tertiary amino, or ester groups. When use of a commercial amine having a N-H functionality of more than 4 is contemplated, for example because of its price, the functionality can be reduced by reacting that amine first with a sufficient amount of a monoepoxide, for example, glycidyl esters of branched monocarboxylic acids. A very suitable amine having 3 N-H functions is a reaction product of diethylene triamine (1 mol) and glycidyl esters of branched monocarboxylic acids (2 mol). This reaction is preferably conducted at moderate temperatures, for example by starting with 80° C., and raising the temperature to 110° C. until the epoxy content is zero.

Another very suitable amine having 3 N-H functions is obtained by reacting 1,6-hexanediamine (1 mol) and glycidyl esters of branched monocarboxylic acids (1 mol) under similar conditions.

An example of an amine having 4 N-H functions is the reaction product of triethylene tetramine (1 mol) and glycidyl esters of branched monocarboxylic acids (2 mol). Apart from a reduction of N-H functionality, the reaction of polyamine and glycidyl ester may also serve to reduce the general reactivity.

The preferred value of p is 3. It will be clear that values of m and p in the formula for the branched adduct are average values and that its formula indicates a general structure of a mixture of reaction products. In general, to prevent gelation or a viscosity which is too high, the amount of secondary amine reacted first with the diglycidyl ether is p mol per mol of the p-functional amine, or slightly more to be safe. Solvents such as glycol ethers or ketones may be used, and the reaction temperature is kept moderate, for example in the range of from 70° to 140° C., more preferably in the range of from 70° to 120° C.

Further suitable compounds to act as component (I) (1) are polymeric reaction products of caprolactam with polyhydric alcohols, and resinous polyols prepared by copolymerization of styrene with allyl alcohol.

Still further suitable compounds to act as component (I) (1) are copolymers of hydroxyalkyl acrylates and methacrylates with other copolymerizable ethylenically unsaturated compounds, such as styrene, methyl methacrylate, butyl acrylate, and vinyl esters, in particular vinyl esters of branched monocarboxylic acids. Copolymers containing the residues of the latter component can be made according to the process described in British Pat. No. 1,418,372.

Mixtures of compounds as outlined above may also be used as component (I) (1), for example mixtures of epoxy resins and epoxy resin/amine adducts.

The compounds outlined above are, in general, suitable for thermosetting compositions to be applied as solutions in organic solvents. Compounds which are solid at room temperature and have softening points above 70° C. can also be used in thermosetting powder compositions and aqueous paint-dispersions.

In the general scope of the invention, component (I) (2), the cross-linking component, has more than one beta-hydroxyl ester group per molecule. The beta-hydroxyl group is needed for sufficient cross-linking at acceptable temperatures within acceptable times, for example, at temperatures up to 200° C., and curing times of up to 30 minutes. By the process of curing or stoving the coating, beta-hydroxyl ester groups of the polyester transesterify to the effect that ester bonds are formed between carboxyl groups of the polyester and hydroxyl groups of component (I) (1), with release of a glycol-type compound; the latter may then evaporate.

The result is a cross-linked coating which is solvent-resistant and infusible. When, on the contrary, a polyester is used which does not contain beta-hydroxyl ester groups, but has, for example, simple alkyl ester groups, such as methyl, ethyl or butyl, the transesterification is too sluggish to effect sufficient cross-linking at acceptable conditions, and the stoved coating will not have acceptable solvent resistance. It can, for example, be easily rubbed away with a piece of cotton cloth soaked in methyl ethyl ketone (MEK).

Components (I) (2) can, in general, be prepared from a polycarboxylic acid or anhydride thereof, and one or more glycols, glycol monoethers, polyols, and/or monoepoxides.

Compounds suitable as component (I) (2) are poly(2-hydroxyalkyl)esters of polycarboxylic acids. Examples are: bis(2-hydroxyalkyl)esters of dicarboxylic acids, such as bis(2-hydroxybutyl)azelate and bis(2-hydroxyethyl)terephthalate; they can be prepared by reacting the dicarboxylic acid with a large excess of the glycol with removal of the water formed, or by reacting the dicarboxylic acid with the suitable monoepoxide. Other suitable compounds are poly(2-hydroxyalkyl)esters of acidic half-esters prepared from a dicarboxylic acid anhydride and a polyhydric alcohol. The latter type is very suitable if a final functionality of more than 2 is desired. An example is a polyester prepared by first reacting equivalent amounts of the dicarboxylic acid anhydride (succinic anhydride, phthalic anhydride) with a trihydric or tetrahydric alcohol (glycerol, trimethylolpropane, pentaerythritol), at temperatures below 150° C. and then reacting the acidic polyester with at least the equivalent amount of an epoxy alkane, such as 1,2-epoxy butane, ethylene oxide, or propylene oxide. Another suitable polyester is a lower 2-hydroxyalkyl-terminated polyalkyleneglycol terephthalate. A further suitable polyester (tetra-functional) is prepared from the half-ester intermediate from trimellitic anhydride and propylene glycol (molar ratio 2:1), by reacting the intermediate with 1,2-epoxy butane and the glycidyl ester of branched monocarboxylic acids.

Suitable polycarboxylic anhydrides for preparing nonacidic polyesters are dicarboxylic acid anhydrides, such as succinic anhydride, phthalic anhydride, tetrahydrophthalic anhydride, hexahydrophthalic anhydride, methylhexahydrophthalic anhydride. Preferred is trimellitic anhydride because of the hydrolytic stability of the products prepared with it.

By glycols and mono-epoxides are understood compounds containing per molecule not more than two real or potential alcohol functions which can be reacted with carboxylic acid or anhydride functions below 150° C.

Very suitable mono-epoxides are glycidyl esters of branched monocarboxylic acids. Further, use can also be made of alkylene oxides, such as ethylene oxide or propylene oxide. Suitable glycols are, for example, ethylene glycol and polyethylene glycols, propylene glycol and polypropylene glycols, and 1,6-hexane diol. Non-acidic polyesters can be prepared, for example, by reacting, in one or more steps, trimellitic anhydride (TMA) with glycidyl esters of alpha-branched monocarboxylic acids in a molecular ratio of 1:1.5 to 1:3, if desired, with the aid of an esterification catalyst, such as stannous octoate or benzyl dimethyl amine, at temperatures of 50° to 150° C.

Alternatively, trimellitic anhydride (1 mol) can be reacted first with a glycol or a glycol monoalkyl ether, such as ethylene glycol monobutyl ether in a molecular ratio of 1:0.5 to 1:1, after which the product is allowed to react with 2 moles of glycidyl esters of branched monocarboxylic acids. Furthermore, the polycarboxylic acid anhydride (containing two or three carboxyl functions per molecule) or a mixture of polycarboxylic acid anhydrides can be reacted simultaneously with a glycol, such as 1,6-hexane diol and/or glycol monoether and mono-epoxide, after which the product can be reacted with a further amount of mono-epoxides, if desired. For aqueous compositions these non-acid polyesters can also be modified with polyamines such as diethylene triamine to form amide polyesters. Such "amine-modified" polyesters may be incorporated in the linear or branched amine adducts described above to form self-curing amine adduct esters.

The non-acidic polyesters of the types described above are soluble in conventional organic solvents, and can in general be mixed readily with component (I) (1).

The weight ratio of the components (I) (1) and (I) (2) can vary between wide limits, in dependence of the reactivity of the components, the desired cure schedule, and the desired properties of the cured coating; the optimum ratio for a chosen mixture can be determined experimentally as usual; as a general guideline that weight ratio can be chosen from about 90:10 to 50:50, and more particularly from about 80:20 to 60:40.

Component (II) is a transesterification-promoting metal compound that is insoluble in liquid hydrocarbons, but may be soluble in other solvents such as water, alcohols, ethers, ketones, and esters, or mixtures thereof. Insoluble in liquid hydrocarbons can be defined more precisely in that the solubility in toluene at 20° C. should be not more than 0.02 percent by weight. The metal compounds are usually solids at room temperature, and are preferably used in finely divided form. Examples are the pigments lead silicate, red lead ($Pb_3O_4$), zinc chromate, zinc tetraoxydichromate, and lead silico chromate, the oxides such as antimony trioxide, and the acetates, formates and carbonates of Pb, Zn, Fe, Li, Cd, and Bi. The quantity of the pigments needed is sometimes such as to exclude their use when the pigmentation they will provide (e.g., white, yellow or red) is not desired. On the other hand, such pigments may be desirable for improvement of corrosion resistance, for example, in primers. These pigments may sometimes provide the desired transesterification activity in pigment/binder weight ratios from 0.08:1 upwards, more preferably from 0.1:1 upwards. Water-soluble salts, sometimes in the form of hydrates or aqueous solutions, may be desirable in aqueous coating compositions. Metal salts as mentioned above may be used in amounts of from about 1% to 8%, preferably from about 3% to about 8% by weight of the binder.

Determination of the gelation time on a hot plate at 180° C. is a very useful rapid test using simple equipment which gives a good indication of desired catalytic acitivity of metal compounds. For a primary screening the epoxy resin/amine adduct as described in Example I (a) was used as component (I) (1), and bis(2-hydroxyethyl)terephthalate as component (I) (2). These components in a weight ratio 80/20 were ground together with the compound to be tested as accelerator, and the dry blend (particle size below 2 mm) subjected to the gelation test. A mixture without accelerator will have gelation times of 600 seconds or more, whereas satisfactory cure can be expected at gelation times of 400 seconds and below. The gelation test can indicate general suitability of metal compounds as catalyst, and selection of potential weight ratios of catalyst to binder to be investigated further. Other compounds may be used as components (I) (1) and (I) (2), or other weight ratios may be applied, and in this way the gelation test can provide very quick information for selection of suitable components and/or weight ratios thereof, whereby only small samples will suffice (approximately 0.5 g of powder for every test), and compounding is very easy.

As compared with hydrocarbon-soluble metal compounds, such as octoates and naphthenates, the present metal compounds can in general be easily compounded with the binder components (I) (1) and (I) (2), in particular in compositions for coating powders and aqueous powder suspensions. Metal compounds soluble in liquid hydrocarbons have usually to be compounded therein via a master batch technique, and may even then cause some stickiness during milling of the powders, or blocking on storage. In aqueous systems such as aqueous paint suspensions or paints for cathodic electrodeposition the metal compounds soluble in liquid hydrocarbons may reduce paint stability by slow hydrolysis or by adsorption onto the pigments.

In general, the components (I) (1), (I) (2) and (II) may be mixed simultaneously or in any order that would be more convenient. In some cases it may be more convenient to make a precondensate first of components (I) (1) and (I) (2), and then to mix the precondensate with component (II).

Conventional additives may be incorporated, such as pigments, fillers, dispersants, stabilizers, and the like. The compositions may be applied onto a variety of materials, preferably metals, such as bare (degreased) steel, phosphated steel, zinc, aluminum, or tin plate (as a can lacquer), as the case may be as the sole coating layer, or as a primer or top-coat. They may be applied by methods known in the art, such as brushing, spraying, dipping, and the electrodeposition.

For the preparation of a solvent-based varnish or paint suitable volatile solvents may be added as, for example, alcohols, ethers, glycol ethers, ketones, esters and the like, and mixtures thereof or mixtures with hydrocarbon solvents.

For the preparation of coating powders the components (I) (1) and (I) (2) or the mixture thereof should preferably have a softening point above 70° C. to avoid stickiness of the powders during preparation and/or storage.

Compositions wherein component (I) (1) is a linear or branched amine adduct as hereinbefore described may be used for the preparation of water-soluble or water-dispersible coating compositions by neutralizing preferably from 20% to 100% of the amino functions with an acid, preferably with an organic carboxylic acid, such as formic acid, acetic acid, citric acid or preferably lactic acid. For the dissolution or dispersal in water no particularly low pH is required (as is often the case in known systems): a pH of 5.5 to 7.0 is usually sufficient. These binder compositions give a good cure at 180° C. and the baked coatings have good mechanical and chemical resistance.

Binder compositions neutralized as described above may be used in 2-20% by weight aqueous solutions or dispersions in cathodic electrodeposition baths, in which the compositions may first be diluted with a water-soluble organic solvent such as a glycol ether, for example, to simplify the neutralization or the dilution with water. The aqueous electrodeposition baths may also contain conventional additives, such as pigments, fillers, dispersants, stabilizers and the like. The deposition baths can be used for applying coatings to steel that has or has not been phosphated.

Compositions in which component (I) (1) comprises an epoxy resin/amine adduct having tertiary amino groups can further be used for the preparation of aqueous powder suspensions, in which the powder particles comprise an intimate mixture of binder components, and in which that mixture has a softening point of at least 70° C. and the particle size in the suspension is essentially below 20 microns. Component (I) (1) may further comprise a solid polyepoxide, preferably a solid polyglycidyl ether of 2,2-bis(4-hydroxyphenyl)propane having a weight per epoxy (WPE) from 700 to 1200, more preferably from 750 to 1000. In view of the preparation methods and storage requirements, the mixture has preferably a softening point of at least 70° C., and more preferably the major binder components should also have softening points above that temperature. In aqueous powder suspensions as described above, no neutralization of the epoxy resin/amine adduct is needed, and in fact the major binder components should be preferably insoluble in water. Further, no surfactant is needed. The aqueous powder suspensions as defined above are preferably prepared by first blending the solid components intimately, and then milling this blend in at least ⅔ times its weight of water to a particle size below 20 microns. The intimate blending is preferably carried out in a manner as known in the art for making powder paints, which includes dry blending of the crushed binder components with other solid components, followed by a short fusion blending, preferably in an extruder, cooling and crushing the cooled extrudate. This way of intimate blending has the advantage that the final aqueous paint dispersions have an improved stability. When the aqueous suspensions have been milled down to a particle size below 20 microns the average particle size will be considerably lower, and presence of a substantial amount of micro-fine particles will improve the stability of the suspensions.

After application, the coatings can be cured by stoving, for example, at temperatures ranging from 150° to 200° C. for most purposes, preferably from 150° to 180° C., for curing times varying from 10 to 30 minutes. For can coating temperatures up to 200° C. may be preferred. The exact cure schedule will, of course, depend on reactivity and amount of components.

Transesterification has been used before for the preparation of alkyd resins, and linear polyesters for fibers, in general for the preparation of fusible polyesters which are soluble in organic solvents. However, the temperatures used are generally far above 200° C., the reaction times are at least several hours, and the amount of catalyst is usually very low, below 0.1% by weight of the polyester. None of these uses indicated that transesterification with components according to the present compositions could be used for the cross-linking in coatings, i.e., for the formation of insoluble, infusible polyester-like coatings, with curing temperatures not higher than 200° C., and curing times essentially below 1 hour.

The invention is illustrated by examples. Parts and percentages therein are by weight, unless stated otherwise, or apparent from the context. Analytical data (amino, epoxy, hydroxyl) for the paints, the binder, or the components are based on non-volatile matter. It will be appreciated that the examples are mere embodiments and are given for the purpose of illustration only and the invention is not to be regarded as limited to any specific components and/or specific ingredients recited therein.

Polyethers D and E are commercial solid glycidyl polyethers of 2,2-bis(4-hydroxyphenyl)propane having WPE of 472 and 893, respectively, a hydroxyl content of 0.29 and 0.33 equivalents per 100 g, respectively, and molecular weights (Mn) of about 900 and about 1400, respectively. Glycidyl ester C10 E is a commercial glycidyl ester of saturated aliphatic monocarboxylic acids, wherein the carboxyl group is attached to a tertiary or quaternary carbon atom (alpha-branched) and which monocarboxylic acids have on average 10 carbon atoms per molecule; the glycidyl ester has a WPE of 250. Impact resistance or impact strength is the reversed impact strength, determined according to the British Standard Falling Ball test, but recorded in cm kg. Values >90 cm kg indicates very good cure. Salt spray resistance was according to ASTM-B 117-64 and recorded as mm loss of adhesion from scratch after the number of days indicated. "M E K rubs" is the number of rubs to be given to the cured coating with a cloth wetted with methyl ethyl ketone. M E K rubs 50 is indication for good cure.

EXAMPLE I

This example illustrates the preparation of hydroxyl-containing resinous compounds, used for further examples.

(a) Adduct of Polyether D, monoethanolamine, and diethanolamine. Polyether D (1888 parts, 4 epoxy equivalents) was melted and reacted with a mixture of monoethanolamine (61 parts, 1 mol) and diethanolamine (210 parts, 2 mol) at 140°-145° C. during 3 hours. The hot liquid adduct was poured onto aluminum foil and allowed to cool. The solid brittle product has a residual epoxy content below 0.01 eq/100 g; the calculated hydroxyl content was 0.67 eq/100 g, and the calculated molar weight 2160.

(b) Linear polyether/amine adduct in solution. To a solution of Polyether D (2832 parts, 6 epoxy equivalents) in ethylene glycol monobutylether (1610 parts) were added diethanolamine (210 parts, 2 mol), 3-N,N dimethylamino propylamine (102 parts, 2 mol) and an adduct of 1,6-diamino hexane and glycidyl ester C10 E (616 parts, 1 mol adduct). This adduct had been prepared by reacting 1,6-diamino hexane (1160 parts, 10 mol) with glycidyl ester C10 E (5000 parts, 20 mol) at 80° C. for 3 hours. The mixture of the Polyether and the amines was reacted by heating first at 85°–90° C. for 2 hours with stirring, and then at 120° C. for 1 hour. The residual epoxy content was zero N-content: 1.60 meq/g, OH content: 0.56 eq/100 g, solids content: 70%w. The calculated molecular weight was 3760.

(c) Resinous polyol RJ-100 was a commercial copolymer of styrene and allyl alcohol having a molecular weight of about 1150 and a hydroxyl content of 0.45 eq/100 g.

(d) Adduct of Polyether E and dimethylol propionic acid. Polyether E (893 g; 1 epoxy equivalent), dimethylol propionic acid (134 g; 1 mol) and benzyl dimethyl amine (2.5 g) were heated with stirring at 140° C. during 4 hours; the acid content was then 0.053 meq/g. The calculated hydroxyl content of the brittle solid product was 0.59 eq/100 g.

EXAMPLE II

This example illustrates the preparation of the polyesters used in further examples as cross-linking compounds.

(a) Bis-(2-hydroxybutyl)azelate.

Azelaic acid (37.6 parts, 0.2 mol), 1,2-epoxybutane (57.6 parts, 0.8 mol) and benzyl dimethyl amine (0.3) parts were heated under reflux for 20 hours. The excess 1,2-epoxy butane was stripped off in vacuo. The product, a viscous oil, had a residual acid content of 0.09 meq/g; the epoxy content was zero. 2-Hydroxy-butyl groups per molecule: 2; molecular weight 332.

(b) Bis-(2-hydroxyethyl)terephthalate. Terephthalate acid (996 parts, 6 mols), ethylene glycol (2232 parts, 36 mols) and dibutyltin oxide (9 parts) were heated at 190°–195° C. during 6 hours while distilling off the water and some ethylene glycol. The mixture was cooled to 60° C. with stirring to initiate crystallization of the ester, and then poured into ice water (5 liters). The ester was filtered off, washed twice with water and dried at 60° C. The product had melting point 100°–105° C.; residual acid content 0.017 meq/g.

(c) Polyester from terephthalic acid and 1,2-propanediol (molar ratio 1:2).

Terephthalic acid (166 parts, 1 mol), 1,2-propanediol (152 parts, 2 mols) and dibutyltin oxide (1.5 parts) were heated at 240°–245° C. with stirring under a nitrogen blanket. Volatiles passed a steam-heated condenser (to prevent losses of 1,2-propanediol), and the water was collected in a Dean & Stark trap. After 20 hours the esterification was complete: water collected was 35.5 parts, and the residual acid content was 0.043 meq/g. The resulting polyester was a clear viscous liquid, having 2 beta-hydroxy ester groups per molecule.

(d) Polyester from trimellitic anhydride and glycidylester C10 E (molar ratio 1:2).

Trimellitic anhydride (192 g, 1 mol), and glycidylester C10 E (500 g, 2 mols) were mixed and heated with stirring to 100° C. An exothermic reaction started, and the temperature was allowed to rise to 190° C. The mixture was cooled to 140° C., benzyl dimethylamine (2 g) was added as catalyst, and heating at 140° C. was continued for 3 hours. The viscous, clear product had an acid content of 0.053 meq/g and a molecular weight (GPC) of about 3000. For comparative purposes the following esters were used:

(e) Dimethyl terephthalate.
Commercial sample, m.p. 140° C.

(f) Diethyl terephthalate
Commercial sample, m.p. 38°–39° C.

(g) Di-n-butyl ester of azelaic acid Commercial sample, liquid.

(h) Polyester from terephthalic acid and 2,2-dimethylpropanediol-1,3-(neopentylglycol), molar ratio 1:2.

Prepared as described in Example II (c) from terephthalic acid (166 parts, 1 mol) neopentylglycol (208 parts, 2 mols) and dibutyltin oxide (1.5 parts). Water: 36 parts recovered. The solid polyester had a residual acid content of 0.01 meq/g. 3-Hydroxy-neopentyl ester groups per molecule: 2.

(i) Polyester from terephthalic acid and butanediol-1,4 (molar ratio 1:2).

Prepared as described in Example II (c) from terephthalic acid (166 parts, 1 mol), butanediol (180 g, 2 mols) and dibutyltin oxide (1.5 parts). The polyester, a sticky solid, had a residual acid content of 0.07 meq/g. 4-Hydroxybutyl groups per molecule: 2.

EXAMPLE III

This example illustrates the screening of pigments for catalytic activity. The hydroxyl-containing resin from Example I (a) (16 g), cross-linking polyester from Example II (b) (4 g) and pigment (16 g) were ground to a fine powder mixture. The gelation times of such powders were determined on a hot-plate at a temperature of 180° C. and are shown in Table I. Gelation times of 600 seconds and more indicate no catalytic activity at all (see numbers 16 and 1–7) or at most a doubtful activity (see numbers 8 and 9). Gelation times of 400 seconds and below are promising indications for satisfactory cure (see numbers 10–15). The results are tabulated in Table I.

TABLE I

| | Gelation Times (Example III) | |
|---|---|---|
| No. | Pigment | Gelation Time, Seconds at 180° C. |
| 1 | Titanium dioxide (Rutil-type) | 600 |
| 2 | Barium sulfate | 600 |
| 3 | Calcium Carbonate | 600 |
| 4 | Red iron oxide | >600 |
| 5 | Zinc sulfide | >600 |
| 6 | Zinc phosphate $(Zn)_3(PO_4)_2$ | 600 |
| 7 | Lead (II) sulfate | 600 |
| 8 | Zinc oxide | 600 |
| 9 | Molybdenum/Zinc/Calcium pigment | 600 |
| 10 | Zinc hydroxide | 215 |
| 11 | Zinc chromate Zn $CrO_4$ | 35 |
| 12 | Zinc tetra oxychromate Zn $CrO_4.4$ $Zn(OH)_2$ | 240 |
| 13 | Lead silicate, commercial grade A | 180 |
| 14 | Lead silicate, commercial grade B | 65 |
| 15 | Red lead $Pb_3O_4$ | 40 |
| 16 | None | 600 |

EXAMPLE IV

This example illustrates the preparation of a pigmented coating powder.

Epoxy resin/amine adduct according to Example I(a) (1600 parts) was coarsely ground to a particle size of about 2 mm, and dry-blended with the polyester of Example II(b) (400 parts), zinc oxide (480 parts), zinc chromate (320 parts), and a commercial acrylate-type flow control agent (10 parts). The blend was homogenized in an extruder (barrel temperature 90° C., screw temperature 40° C., screw speed 40 rpm). The extrudate (95° C.) was cooled to room temperature, ground and sieved to a particle size <75 micrometer. The yellow powder was applied by electrostatic spraying to degreased, cold-rolled steel panels, and the panels were stoved at 180° C. for 20 minutes. The yellow coatings had the following properties:

appearance: good
film thickness: 55–60 micrometer
hardness (Konig): 180 seconds
adhesion (Gitterschnitt): Gt 0—0 = unaffected, 5 = no adhesion
impact resistance: 90 cm. kg
xylene immersion (15 minutes/22° C.): unaffected As can be seen from Example III, the only active pigment used in Example IV is zinc chromate.

EXAMPLE V

This example illustrates the preparation of an aqueous powder slurry.

The sieved powder from Example IV (particle size <75 microns, 200 parts) and demineralized water (200 parts) were mixed in a high-speed laboratory ball mill for 10 minutes. A slurry with a particle size below 20 micrometer was obtained. More water (20 parts) was added to adjust the viscosity. The slurry was sprayed, using a normal paint spray gun at air pressure of 5 atmospheres, onto degreased cold-rolled steel panels. After a flash-off time of 15 minutes the panels were stoved at 180° C. for 20 minutes.

The cured yellow coatings had properties as follows:
appearance: good
thickness: 40–45 micrometer
adhesion (Gitterschnitt) Gt 0
xylene immersion (15 minutes/22° C.): unaffected
impact resistance: 90 cm kg
hardness (Konig): 180 seconds.

EXAMPLE VI

This example illustrates the solubility of various metal salts in toluene.

Metal salt (4 g) was finely powdered and stirred at room temperature (20° C.) in toluene (100 g) for 16 hours. Insoluble material was filtered off and dissolved material was determined by weighting after evaporation of toluene in vacuo at 60° C. In this way the following solubilities were found:

Lithium acetate: <0.001 g/100 g
Zinc acetate. 2H$_2$O: <0.001 g/100 g
Basic iron-III-acetate: 0.011 g/100 g
Cadmium acetate. 2H$_2$O: <0.001 g/100 g
Lead-II-carbonate: <0.001 g/100 g
Lead-II-acetate. 3H$_2$O: 0.009 g/100 g
Basic iron-III-formiate: 0.010 g/100 g
Bismuth-III-acetate: 0.010 g/100 g

EXAMPLE VII

This example illustrates the catalytic velocity of hydrocarbon-insoluble metal salts from Example VI.

The hydroxyl-containing resin from Example I(a) (16 g), cross-linking polyester from Example II(b) (4 g), pigment (16 g) and metal salt (1.1 g) were ground to a fine powder dry-mixture. The gelation times of such powders were determined on a hot-plate at 180° C. and are shown in Table II. Without metal salt catalyst (Numbers 1, 3 and 5) gelation times were 600 seconds or more. The metal salts evaluated decreased gelation times considerably. For comparative purposes, the cross-linking polyester bis(2-hydroxyethyl)terephthalate (Example II (b)) was replaced by dimethylterephthalate (Example II (e)). The corresponding powders (Numbers 14 and 15) did not gel within 600 seconds, indicating that beta-hydroxyl groups in the ester are required for cross-linking under these conditions.

TABLE II

| | Gelation Times (Example VII) | | |
|---|---|---|---|
| Number | Cross-linking Polyester from Example | Pigment | Metal Salt | Gelation Time, Seconds at 180° C. |
| 1 | II (b) | TiO$_2$(rutile) | none | >600 |
| 2 | " | " | Zn acetate.2H$_2$O | 170 |
| 3 | " | BaSO$_4$ | none | >600 |
| 4 | " | " | Zn acetate.2H$_2$O | 175 |
| 5 | " | AnO | none | 600 |
| 6 | " | " | Zn acetate.2H$_2$O | 90 |
| 7 | " | " | Li acetate | 190 |
| 8 | " | " | Basic Fe(III) acetate | 120 |
| 9 | " | " | Basic Fe(III) formiate | 115 |
| 10 | " | " | Pb(II) acetate.3H$_2$O | 150 |
| 11 | " | " | Pb(II) carbonate | 170 |
| 12 | " | " | Cd acetate.2H$_2$O | 85 |
| 13 | " | " | Bi (III) acetate | 360 |
| Comparative Examples | | | | |
| 14 | II (e) | ZnO | Zn acetate.2H$_2$O | 600 |
| 15 | II (e) | " | Li acetate | 600 |

EXAMPLE VIII

This example illustrates the preparation of an aqueous powder slurry.

The hydroxyl-containing resin from Example I(a) (1600 parts) was coarsely ground to a particle size about 2 mm, dry-blended with the cross-linking polyester from Example II(b) (200 parts), titanium dioxide (320 parts), Zn oxide (1280 parts) and a commercial acrylate-type flow control agent (10 parts). This blend was homogenized by extrusion on a laboratory extruder using the conditions given in Example IV. The extrudate was ground and sieved to a particle size of less than 75 micrometer. This powder (200 g) and Zn acetate. 2H$_2$O (6 g) were dispersed in demineralized water (200 g) in a high speed laboratory ball mill during 10 minutes. After thinning with more water (20 g) the resulting stable slurry (particle size <20 micrometer) was sprayed onto degreased cold-rolled steel panels which were flashed-off for 15 minutes and then stoved at 180° C. for 20 minutes. Very well flowed, glossy white coatings with a thickness around 40 micrometers were obtained which has the following properties:

Hardness (Konig): 160 seconds
Adhesion (Gitterschnitt): Gt0
Impact resistance: 90 cm kg
Xylene immersion (15 min/22°): unaffected
Methylethyl ketone resistance: >100 double rubs

EXAMPLE IX

This example illustrates the influence of pigments on cross-linking of a cathodic electrodeposition system.

The resin solution of Example I (b) (1637 g, 1146 g solids) was blended with the cross-linking polyester of Example II (d) (426 g) which had been dissolved in ethylene glycol monobutylether (183 g). Lactic acid (82 g of a 90%w solution in water) was added, and the blend was thinned slowly with dimineralized water (3930 g). The resulting aqueous solution had a milky appearance and a solids content of 25 w. Pigment (37.5 g) was dispersed in part of the aqueous solution (150 g) in a laboratory sand mill for 30-45 minutes, when a Hegman-fineness of grind 10-15 was reached. The resulting pigment dispersions were thinned with more of the abovementioned aqueous solution (450 g) finally with demineralized water (612.5 g) to a solids content of 15%w. The resulting paints had pH value between 6 and 6.2 and were cathodically electro-deposited onto solvent-degreased steel panels at voltages between 150 and 200 V in order to deposit coatings with dry film thicknesses around 20 micrometer. The coatings were rinsed with water and stoved at 180° or 200° C. during 30 minutes. The degree of cross-linking achieved was assessed by determining the number of MEK runs and the impact resistance of the coatings. MEK-rubs 10 and impact strength <10 cm kg indicating no more were obtained with the following pigments: titanium oxide, barium sulfate, red iron oxide, green chromium trioxide, zinc phosphate, zinc oxide, molybdenum/zinc calcium pigment. Evaluation results of other pigments are given in Table III. Adequate cure was obtained with numbers 4-9, whereas number 3 showed only a very slight degree of cure.

TABLE III
Evaluation of Electrodeposited Coatings from Example IX

| Number | Pigment | Stoving (30 min.) °C. | MEK rubs | Impact Strength cm kg |
|---|---|---|---|---|
| 1 | None | 180° | 5-10 | 5 |
| 2 | " | 200° | 10 | 5 |
| 3 | Zinc hydroxide | 180° | 50 | 20 |
| 4 | Antimony trioxide | 180° | 50 | 60 |
| 5 | " | 200° | >50 | 90 |
| 6 | Lead silicate | 180° | 50 | 90 |
| 7 | " | 160° | >50 | >90 |
| 8 | Red lead, (Pb3O4) | 180° | >50 | 90 |
| 9 | Lead silico chromate | 180° | >50 | >90 |

EXAMPLE X

This example illustrates the preparation of a cathodic electrodeposition paint.

The resin solution of Example I (b) (196.4 g; 137.5 g solids) was blended with the cross-linking polyester of Example II(d) (51.2 g) which had been dissolved in ethylene glycol mono butyl ether (21.9 g). Lactic acid (9.8 g) was added and the blend was slowly thinned with dimineralized water (472 g) with stirring. Part of this aqueous solution (150 g), titanium dioxide (22 g), lead silicate (13.5 g) and carbon black (2 g) were dispersed in a sand mill for 45 minutes when a Hegman fineness of grind of 10 was reached. This pigment paste was thinned with more of the abovementioned aqueous solution (450 g) and finally with demineralized water (612.5 g) to give a paint with a solids content of 15%w.

The paint had a pH of 6.1 and a specific conductivity of 1700 micro S/cm (22° C.). It was electrodeposited cathodically onto degreased cold-rolled steel panels at a voltage of 150 V (direct current) during 2 minutes. The coating panels were rinsed with water and stoved at the temperatures specified below. Very smooth, grey coatings with a thickness between 17 and 19 micrometer were obtained. The table shows that down to stoving temperatures of 160° C. adequate cross-linking and excellent salt spray resistance were obtained:

| Stoving Conditions °C./minutes | MEK rubs | Impact Strength, cm kg | Salt Spray resistance, mm (20 days) |
|---|---|---|---|
| 180°/30 | >50 | 90 | >2 |
| 160°/30 | 50 | 70-90 | >2 |
| 150°/30 | 20-30 | 5 | >2 |

EXAMPLE XI

This example illustrates the preparation of cathodic electrodeposition paints containing a hydrocarbon-insoluble catalyst.

(a) An aqueous binder solution having a solids content of 25%w was prepared as described in Example IX but using acetic acid (55 g) instead of the lactic acid. Part of this solution (100 g), red iron oxide (11.3 g), clay ASP-100 (0.7 g), Zinc acetate [Zn (CH$_3$COO)$_2$.2H$_2$O] (1.6 g) and water (20 g) were dispersed in a sand-mill for 45 minutes when the Hegman fineness of grind was 10. The pigment dispersion was thinned with more of the 25%w aqueous solution (100 g) and demineralized water (169 g) to a solids content of 15%w.

The resulting paint had a pH of 6.0 and a specific conductivity 3080 micro S/cm (25° C.). It was electrodeposited onto degreased cold-rolled steel panels at the conditions specified below. After rinsing with water the panels were stoved at 180° C. for 30 minutes. The following tabulation shows that well-cross-linked coatings were obtained but that above an application voltage of 50 V the deposited coatings had a rough appearance.

| Application voltage (2 min) | Dry Film thickness micrometer | MEK rubs | Impact strength cm kg | Coating |
|---|---|---|---|---|
| 50 V | 4-5 | 50 | >90 | smooth, semigloss |
| 100 V | 8-9 | >50 | >90 | rough areas |
| 150 V | 11-12 | >50 | 90 | rough coating |
| 200 V | 15-25 | >50 | 90 | rupture |

(b) Formulation (a) was repeated except that sand-milling was carried out in the presence of acetylacetone (3 g). The resulting paint (solids content 15%) had a pH of 6.0 and a specific conductivity of 2700 micro S/cm (25° C.). Electrodeposition and stoving was carried out as in Example X (a). Well-flowed smooth coatings were obtained at voltages up to 200 V. All coatings were well-cross-linked as is evident from the following tabulation:

| Application Voltage (2 min) | Dry Film thickness micrometer | MEK runs | Impact strength, cm kg | Coating appearance |
|---|---|---|---|---|
| 50 V | 5–6 | 50 | 90 | smooth, semi-gloss |
| 100 V | 7–9 | >50 | 90 | " |
| 150 V | 12–13 | >50 | >90 | " |
| 200 V | 19–21 | >50 | >90 | " |

The panel coated at 200 V was exposed in the ASTM B 117-64 salt-spray test. After an exposure time of 20 days the loss of adhesion from the scratch was less than 3 mm.

EXAMPLE XII

This example demonstrates the good compatibility between combination of powder coating and cathodic electrodeposition primer.

A degreased cold-rolled steel panel was cathodically electrocoated at 200 V using the formulation described in Example XI (b). The panel (coating thickness 20 micrometer) was rinsed with water and blown dry with pressurized air. The yellow coating powder described in Example IV was electrostatically sprayed on top of the (still uncured) red electrodeposition coating. The panel was then stoved at 180° C. for 20 minutes. A very smooth well-flowed coating with a total thickness of 75–80 micrometer was obtained. The good compatibility of the yellow powder and the red electrodeposition coating is seen from the fact that the resulting coating had an orange-red color due to (partial) mixing of the coatings during stoving. The combined coating was well cross-linked (MEK rubs >50, impact strength 40 cm kg) and had an excellent salt spray resistance.

EXAMPLE XIII

This example illustrates the preparation of solvent-based lacquers containing hydrocarbon-insoluble metal salt catalysts.

All details and resuls have been collected in Table IV. Hydroxyl-containing resins from Example I and cross-linking polyesters from Example II were blended in weight ratios as indicated, and thinned with ethylene glycol mono butylether to a solids content of 40%w. Metal acetate catalysts (2% metal on binder, except Li) and a fluorocarbon-based surfactant (0.1%w on binder) were added, and the mixtures were pigmented by sand-milling (45 minutes) with sufficient titanium dioxide to give a pigment/binder weight ratio of 0.5. The resulting paints were applied onto degreased, cold-rolled steel panels using a wire-rod applicator, allowed a flash-off period of 2 hours at room temperature, and stoved for 30 minutes at 180° C. (except nr. 3); film thickness was 15–20 micrometer.

From the data in Table IV the following can be concluded:

That good cross-linking is achieved with various metal salt catalysts provided the cross-linking polyester contains 2-beta-hydroxyalkyl ester groups (Numbers 2–11);

That polyesters without beta-hydroxylester groups fail to cross-link at 180° C. within 30 minutes (Numbers 12–15).

TABLE IV

Solvent-based lacquers (Example XIII)

| Number | Hydroxyl-containing resin Ex. g | Cross-linking polyester Ex. g | Type** | MEK rubs | IS* cm kg |
|---|---|---|---|---|---|
| 1 | I(a) 21.6 | II(c) 11.3 | — | <10 | <5 |
| 2 | I(a) 21.6 | II(c) 11.3 | Zn | >50 | >90 |
| 3* | I(a) 21.6 | II(c) 11.3 | Zn | >50 | >90 |
| 4* | I(a) 21.6 | II(c) 11.3 | Li | >50 | >90 |
| 5 | I(a) 21.6 | II(c) 11.3 | Pb | >50 | >90 |
| 6 | I(a) 21.6 | II(c) 11.3 | Fe | >50 | >90 |
| 7 | I(a) 21.6 | II(c) 11.3 | Ca | >50 | >90 |
| 8 | I(a) 21.6 | II(a) 13.3 | Zn | >50 | >90 |
| 9 | I(c) 11.5 | II(c) 11.3 | Zn | >50 | 70 |
| 10 | I(c) 11.5 | II(c) 11.3 | Pb | 50 | 60 |
| 11 | I(d) 11.5 | II(c) 11.3 | Pb | >50 | >90 |
| Comparative Examples ||||||
| 12 | I(a) 21.6 | II(f) 8.9 | Zn | 15 | <5 |
| 13 | I(a) 21.6 | II(g) 12.0 | Zn | <10 | <5 |
| 14 | I(a) 21.6 | II(h) 13.4 | Zn | 45 | 10 |
| 15 | I(a) 21.6 | II(i) 12.4 | Zn | 15 | <5 |

*IS: Impact Strength
Number 3: Stoving Schedule 30 minutes at 160° C.
Number 4: Li⁺ level on binder 0.5% w.
**Zn: Zinc acetate.2H₂O; Li: lithium acetate; Pb: lead-II-acetate. 3H₂O; Fe: basic iron-III-acetate; Cd: cadmium-II-acetate.2H₂O.

We claim as our invention:

1. An aqueous paint composition suitable for cathodic electrodeposition comprising a binder comprising (1) a non-acidic resinous compound having the formula:

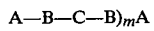

wherein m is a number from 0 to 2, A is a group which is linked to B through a tertiary amino function and being derived from an amine having one secondary amino group, B is a group

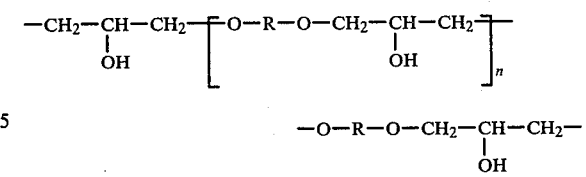

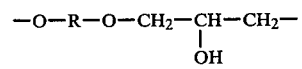

wherein n is a number from 0 to 4, R is a hydrocarbon radical of a dihydric phenol, and C is a group which is linked to B through two tertiary amino functions and being derived from an amine containing at least two secondary amino groups or a primary mono-amino groups, (2) a non-acidic polyester prepared by reacting a polycarboxylic acid or anhydride thereof with at least one hydroxyl-containing compound selected from the groups consisting of glycols, glycol mono-ethers and polyols, and (3) a polyvalent metal compound, said binder having from about 20% to about 100% of the amino groups neutralized with a carboxylic acid.

2. The aqueous paint composition of claim 1, wherein the binder comprises from about 2 to about 20% by weight of the composition.

3. The composition of claim 1, wherein A is a dialkanolamino group.

4. The composition of claim 1, wherein the non-acidic polyester is prepared from a polycarboxylic acid or anhydride thereof with a monoepoxide.

5. The composition of claim 4, wherein polycarboxylic acid anhydride is trimellitic anhydride.

6. The composition of claim 1, wherein the polyvalent metal compound is a transesterification-promoting metal compound which is insoluble in liquid hydrocarbons.

7. The composition of claim 1, wherein the carboxylic acid is lactic acid.

8. The composition of claim 1, wherein the non-acid resinous compound is a polymeric glycidyl or glyceryl polyether of 2,2-bis(4-hydroxyphenyl)propane having a molecular weight (Mn) of more than 1400.

* * * * *